United States Patent [19]

Tulpan

[11] Patent Number: 5,406,624
[45] Date of Patent: Apr. 11, 1995

[54] DATA PROCESSOR SYSTEMS

[75] Inventor: Yossi Tulpan, Nes Ziona, Israel

[73] Assignee: Algorithmic Research Ltd., Givat Shmuel, Israel

[21] Appl. No.: 115,067

[22] Filed: Sep. 2, 1993

[30] Foreign Application Priority Data

Sep. 4, 1992 [IL] Israel .................... 103062

[51] Int. Cl.⁶ ............................................. H04L 9/00
[52] U.S. Cl. ........................................ 380/4; 380/9;
380/23; 380/25; 380/30; 380/49; 380/50;
235/380
[58] Field of Search ............... 380/4, 9, 30, 49, 50,
380/22, 21, 23, 43, 46, 25; 235/380

[56] References Cited

U.S. PATENT DOCUMENTS

| 4,598,170 | 7/1986 | Piosenka et al. | 380/4 |
|---|---|---|---|
| 4,783,798 | 11/1988 | Leibholz et al. | 380/23 |
| 4,797,928 | 1/1989 | Dykes | 380/49 |
| 4,881,263 | 11/1989 | Herbison et al. | 380/21 |
| 4,914,696 | 4/1990 | Dudczak et al. | 380/21 |
| 4,924,513 | 5/1990 | Herbison et al. | 380/21 |
| 4,942,606 | 7/1990 | Kaiser et al. | 380/4 |
| 4,965,804 | 10/1990 | Trbovich et al. | 380/21 |
| 4,980,913 | 12/1990 | Skret | 380/23 |
| 4,984,272 | 1/1991 | McIlroy et al. | 380/25 |
| 4,995,112 | 2/1991 | Aoyama | 380/25 |
| 5,001,755 | 3/1991 | Skret | 380/46 |
| 5,048,087 | 9/1991 | Trbovich et al. | 380/43 |
| 5,063,596 | 11/1991 | Dyke | 380/49 |
| 5,065,429 | 11/1991 | Long | 380/25 |
| 5,224,166 | 6/1993 | Hartman, Jr. | 380/50 |

FOREIGN PATENT DOCUMENTS

| 0272070 | 6/1988 | European Pat. Off. | G06F 3/033 |
|---|---|---|---|
| 0297347A2 | 6/1988 | European Pat. Off. | G06F 12/14 |
| 0440800A1 | 6/1990 | European Pat. Off. | B42D 15/10 |
| 2246457 | 7/1990 | United Kingdom | G06F 12/14 |
| 2255662 | 11/1992 | United Kingdom | G06F 3/023 |

Primary Examiner—Bernarr E. Gregory
Attorney, Agent, or Firm—Benjamin J. Barish

[57] ABSTRACT

A processor unit connectable between a computer and a keyboard unit stores a plurality of programs for operating the processor unit according to either a Transparent Mode wherein stored data inputted from the keyboard via a keyboard I/O port in the processor unit is transmitted to the computer unit, or according to one of a plurality of Special Handling Modes, and is controlled to select either the Transparent Mode or one of the Special Handling Modes.

18 Claims, 12 Drawing Sheets

DATA PROCESSOR SYSTEMS

FIELD AND BACKGROUND OF THE INVENTION

The present invention relates to data processor systems, and particularly to a processor unit for use with a general purpose data processor system, such as a personal computer. The invention is especially useful as a security unit to be attached to a computer and its peripheral units to enable the computer to perform various security functions in a manner which does not jeopardize the security information, and the invention is therefore described below with respect to such an application.

Security functions, such as encryption, decryption, the computation of a message authentication code (MAC), digital signature generation, public key certification, etc., are often performed in a dedicated processor unit to be attached to a general purpose computer. Such an attached processor isolates the secret data, e.g., keys and passwords, from the general purpose computer in a manner so as not to compromise the secured activities while permitting the general purpose computer to perform the non-secured activities. However, a general purpose computer, such as a PC (personal computer), provides a large set of possible ways of compromising the security, e.g., Trojan horse or virus software. Since the general purpose computer must be able to communicate with the security unit, and since the software of the general purpose computer is corruptible, it is possible to compromise secret information or to "trick" the security unit into performing improper operations involving security risks. Where the security unit may have special purpose I/O devices, such as a smartcard reader, the danger of compromising security is even increased.

Ideally, to minimize security risks, the following rules should be observed:

(1) Secret key operations should be performed in the privacy of the security unit to be attached to the general purpose computer, and not in the general purpose computer where such data may be compromised, e.g., by resident Trojan horse software;

(2) The password or personal identification number (PIN) used to allow access to secret keys (via data encryption or other means) should not pass through the general purpose computer since, if this secret information is keyed into the general purpose computer, it may be compromised, e.g., by resident Trojan horse software;

(3) There should be no opportunity of having data to be signed, encrypted or authenticated, being forged by resident Trojan horse software in the general purpose computer. This is of particular importance in the context of digital signatures. The corrupted general purpose computer may display one set of data on the display terminal, and may request that the attached security unit sign a completely different set of data.

One way of addressing these problems is to provide the security unit with its own independent keyboard, display, printer, and/or other interface hardware components, such that the data processor system would have two keyboards in the immediate vicinity of the general purpose computer, two displays, etc., one for the computer and one for the security unit. However, such systems requiring the duplication of keyboards, displays, printers, etc., are very costly, are inconvenient to use because the work area is cluttered with extra but seldom used keyboards, displays, etc., require an independent power supply, and/or require additional data links.

It would therefore be highly desirable to provide a processor unit in general, and a security unit in particular, which may be used with a conventional computer unit, keyboard unit, etc., but which takes over control of the connecting lines between the computer unit and its perhipheral units. It would be particularly desirable to provide such a capability in a security unit so as to prevent the compromise of security information to be processed in the security unit.

OBJECTS AND BRIEF SUMMARY OF THE INVENTION

According to the present invention, there is provided a security unit for use in a data processor system including a computer unit and a keyboard unit communicating with the computer unit via keyboard I/O ports in the keyboard unit and computer unit, respectively. The security unit is adapted to be connected between the computer unit and the keyboard unit, to isolate the computer unit from the keyboard, and comprises: a keyboard I/O port for connection to the keyboard I/O port in the keyboard unit for receiving data inputted from the keyboard unit; a memory for storing the inputted data; a keyboard I/O port connectible to the keyboard I/O port in the computer unit; a processor storing a plurality of security programs for operating the security unit according to either a Transparent Mode wherein the stored data inputted from the keyboard unit via the keyboard I/O port is transmitted via the keyboard I/O port to the computer unit and is passed through the security unit without any change being made by the security unit in the stored data as if the security unit were not present, or according to a Special Handling Mode wherein a selected security program is executed while secret data inputted via the keyboard is isolated from the computer unit; and control means for controlling the processor to select either the Transparent Mode or a Special Handling Mode.

The "Transparent Mode" is herein defined as one wherein the security unit transmits the data through the security unit and is passed through the security unit without making any change in such data, as if the security unit were not present in the data processor system. When the security unit operates according to a Special Handling Mode, any one of several such modes may be selected as will be described more particularly below.

According to further features in the described preferred embodiment, the security unit further includes a smartcard reader/writer for reading data from and/or writing data into a smartcard inserted therein, which data is also stored in the memory. The control means also controls the processor to process such data according to the selected mode of operation.

The novel security unit thus takes over control of the connecting lines between the computer unit and its peripherals. Such a capability is particularly useful unit for performing various security functions while isolating the computer unit from its peripherals so as not to jeopardize security information.

According to further features in the described preferred embodiment, the security programs stored in the processor of the security unit include a plurality of Special Handling Modes of operation. One particularly important Special Handling Mode is a Load Program Mode, wherein the security unit receives a program from the computer unit, receives a block of data purporting to be the signature of the program's fingerprint, computes the program's fingerprint, checks to determine whether the above block of data is inded the signature of the program's fingerprint, and if so loads the program into the security unit's processor.

A "signature" is the electronic analog of a handwritten signature, i.e., a distinctive mark identifying a particular source. A "program's fingerprint", sometimes called a "hash function" or "message digest" is herein defined as a block of data digested from, and distinctively identifying, the much larger data of a program. These terms are known in cryptology, for example as discussed in "Contemporary Cryptology—The Science of Information Integrity", edited by Gustavus J. Simmons, IEEE Press, copyright 1992, Pages 195, 199, 200.

Preferably, and according to the preferred embodiment described below, the control means comprises preprogrammed software automatically controlling the processor according to the commands inputted from the keyboard unit or the computer unit. It is contemplated, however, as described in a second embodiment, that the control means could comprise a manual switching device for manually selecting either the Transparent Mode or a Special Handling Mode.

It will thus be seen that the present invention addresses the above-described security problems by having the peripheral I/O devices (e.g., keyboard, display, printer, etc.) of the data processor system connected via cables to the security unit, and not to the computer unit. The security unit has another set of I/O ports connected via cables to the I/O ports of the computer unit and its peripheral devices. This means that the security unit can "take over control" of the peripheral devices, effectively disconnecting them from the computer unit, and thereby assure the user that the data to or from the peripheral devices is not compromised or forged by resident software in the computer unit. Usually, the peripheral I/O devices, will be "transparently connected" to the security unit, in that the security unit simply passes the data flow transparently. Where security is not to be compromised, however, these peripheral devices will be effectively disconnected from the computer unit so as to prevent the possibility of corruption or compromise of the data by the computer unit.

A data processor system including a security unit constructed in accordance with the present invention provides a number of advantages:

1. Such a system provides a large saving in cost because peripheral I/O devices (keyboards, displays, printers, etc.) need not be duplicated for the security unit;
2. Such a system can also use the higher-quality peripheral devices generally provided for the computer unit, rather than the lower quality peripheral devices generally provided for the security unit;
3. Such a system is more convenient for the user, in that the work area is not cluttered with extra but seldom used keyboards, displays, etc.;
4. Such a system does not require an independent power supply for the security unit, since it can use the power line to the keyboard as a source of power; and
5. Such a system requires no additional data link cables for communication, as data communication between the computer unit and the security unit can be done using the conventional keyboard, printer, video or other connections.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
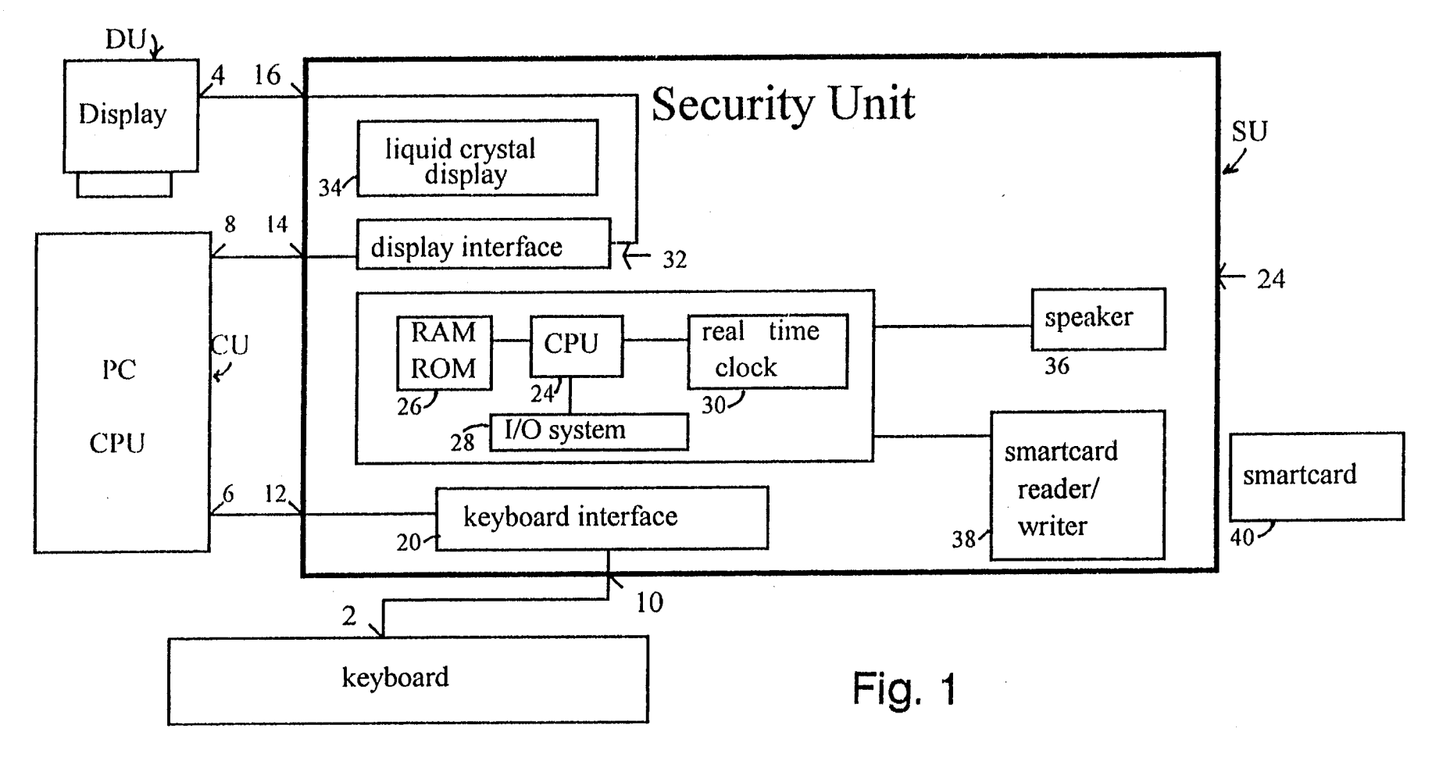
FIG. 1 is a block diagram illustrating one form of data processor system including a security unit constructed in accordance with the present invention.

The data processor system illustrated in FIG. 1 of the drawings includes a conventional computer unit CU, such as a PC general purpose computer, a conventional keyboard unit KU, and a conventional display unit DU commonly provided in such systems. Also illustrated in FIG. 1 is a separate security unit SU capable of performing various sensitive security functions such as encryption, decryption, computation of a message authentication code (MAC), digital signature generation, public key certification, etc. Security unit SU is connected to the computer unit CU, keyboard unit KU, and display unit DU in a manner enabling the security unit to communicate with all of the above units to perform non-secured activities in the normal manner, but also to isolate secret data (such as keys and passwords) from the computer unit so as not to permit the latter unit to compromise or corrupt such secret data.

The keyboard unit KU includes a conventional I/O port 2, and similarly the display unit DU includes a conventional I/O port 4, which ports are normally connected to I/O port 6 and I/O port 8 of the computer unit CU. In this case, however, the keyboard I/O port 2 is connected to a keyboard I/O port 10 in the security unit SU; and the latter unit includes another I/O port 12 which is connected to the I/O port 6 of the computer unit CU; similarly, the security unit SU includes a display I/O port 14 connected to the corresponding port 8 in the computer unit CU, and another display I/O port 16 connected to the corresponding port 4 in the display unit DU. Thus, the security unit SU isolates the computer unit CU from its peripheral keyboard unit KU and display unit DU.

The security unit SU includes a keyboard interface 20 for controlling the flow of data between its two keyboard I/O ports 10 and 12. The keyboard interface 20 is in turn controlled by a processor, generally designated 22, including a CPU 24, a RAM/ROM memory 26, an I/O system 28, and a real-time internal clock 30. The operating software is stored in the ROM section of memory 26, and the other data is stored in the RAM section of this memory. The real-time clock 30 keeps track of the time and date independently of the real-time clock generally included in the computer unit CU.

The processor 22 further controls a display interface 32 to the display I/O port 16 connected to the display unit DU. The security unit SU further includes its own display 34, such as an LCD or LED display, also controlled by the display interface 32, e.g., for indicating the status of the security unit. The security unit SU further includes a speaker controlled by processor 22 to generate sounds (e.g., warning signals) at appropriate times, as will be described more particularly below.

Finally, the security unit SU includes a smartcard reader/writer 38 adapted to receive a smartcard 40 for reading information from the smartcard and/or writing information into it, according to particular commands.

The processor 30 in the security unit SU stores a plurality of programs for operating the system. The plurality of programs are stored in the ROM section of memory 26, and are selected according to the data and commands introduced into the security unit via the computer unit CU, the keyboard KU or the smartcard 40. This data is stored in the RAM section of memory 26, while the command associated with the data is examined to determine whether a security function is involved. If not, the security unit operates according to a "Transparent Mode" wherein the stored data inputted via the keyboard unit KU or the smartcard 40 is transmitted via the I/O ports 12, 16, to the computer unit CU or display unit DU after a minor time delay; however, if a security function is involved, as determined by the command associated with the inputted data, the processor 22 of the security unit SU operates according to a Special Handling Mode, depending on the command involved.

Figure 2:
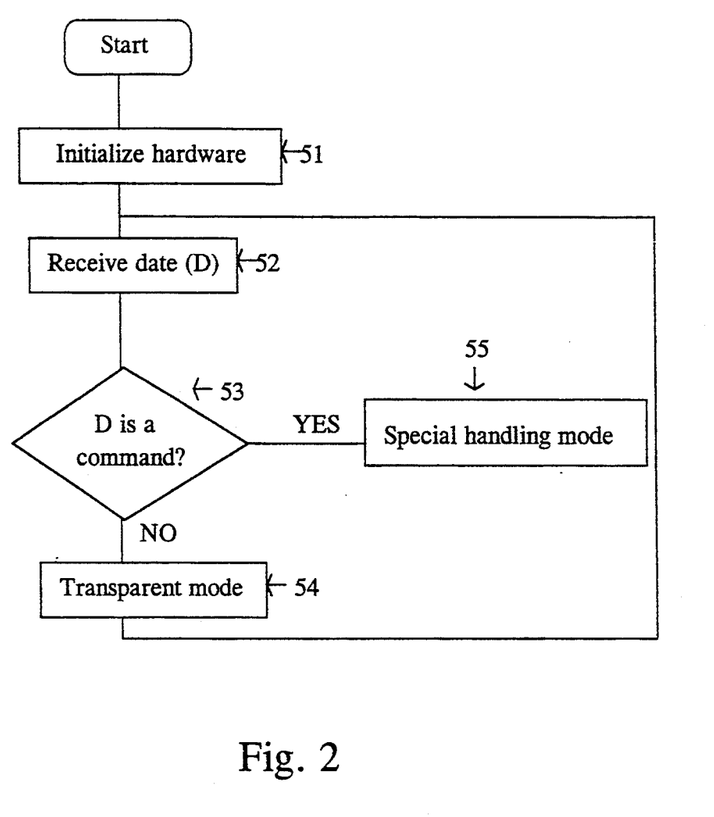
FIG. 2 is a flow chart illustrating the main program run of the security unit included in the data processor system of FIG. 1.

FIG. 2 is a flow chart illustrating the main program run of the security unit SU. Thus, upon start, the hardware is initialized (block 51), and the security unit SU then begins its main loop. For any data (D) received from any unit connected to the security unit, e.g., the keyboard unit KU or the display unit DU, the security unit SU checks to see if the data is a special sequence for a command (C). If not, the data is sent to the intended unit for that data. For example, if the data was received from the keyboard unit KU via its I/O port 2 and was intended to the I/O port 6 of the computer unit CU, the data enters the security unit SU via its I/O port 10, and after processing, is fed from its I/O port 12 to the I/O port 6 of the computer unit. Thus, in this mode the security unit is "transparent" and all units connected to it function as if the security unit were not there, except for the delay in transferring the data by the security unit.

If, however, the data involves a special sequence for a command specifying a Special Handling Mode, the appropriate Special Handling Mode program is executed.

It is to be noted that the main loop as illustrated in FIG. 2 is a forever-loop: it only ends upon power failure. The command can be active or inactive, depending on the existence of the appropriate program in the memory of the security unit SU. Some programs (e.g., the load program of FIG. 3) are always active and they reside in the ROM section of the memory 26. Other programs, however, e.g., some new version of one of the other programs, may still be unloaded, and the command will only cause an error message from the security unit SU to the computer unit CU.

FIGS. 3-12 illustrate some example programs which handle commands as described above.

Figure 3:
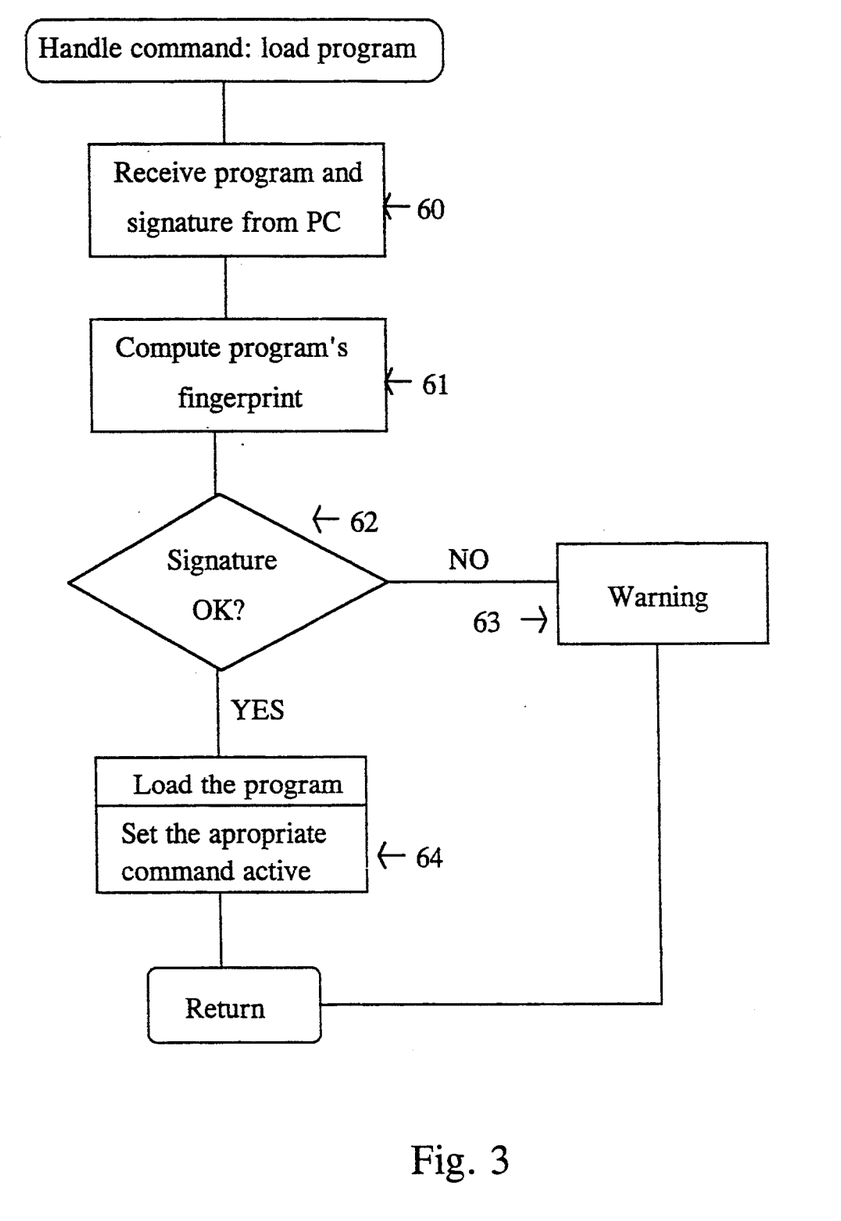
FIGS. 3–12 are flow charts illustrating a plurality of Special Handling Mode programs which may be stored in the security unit of FIG. 1.

FIG. 3 illustrates the program for the Load command, in which the security unit SU receives a program and a "signature" (i.e., a block of data purporting to be the signature of the program's fingerprint from the computer unit CU (block 60), computes the program's fingerprint (block 61), and checks to see whether the signature is valid (block 62). If not, it produces a warning (block 63), in a manner described more particularly below with respect to FIG. 12; but if the signature is valid, it loads the program and activates the appropriate command (block 64).

The commands may be stored in a Look-up Table within the ROM section 26 of the security unit SU. If needed, a special sequence may be added to the table which identifies the commands.

Figure 4:
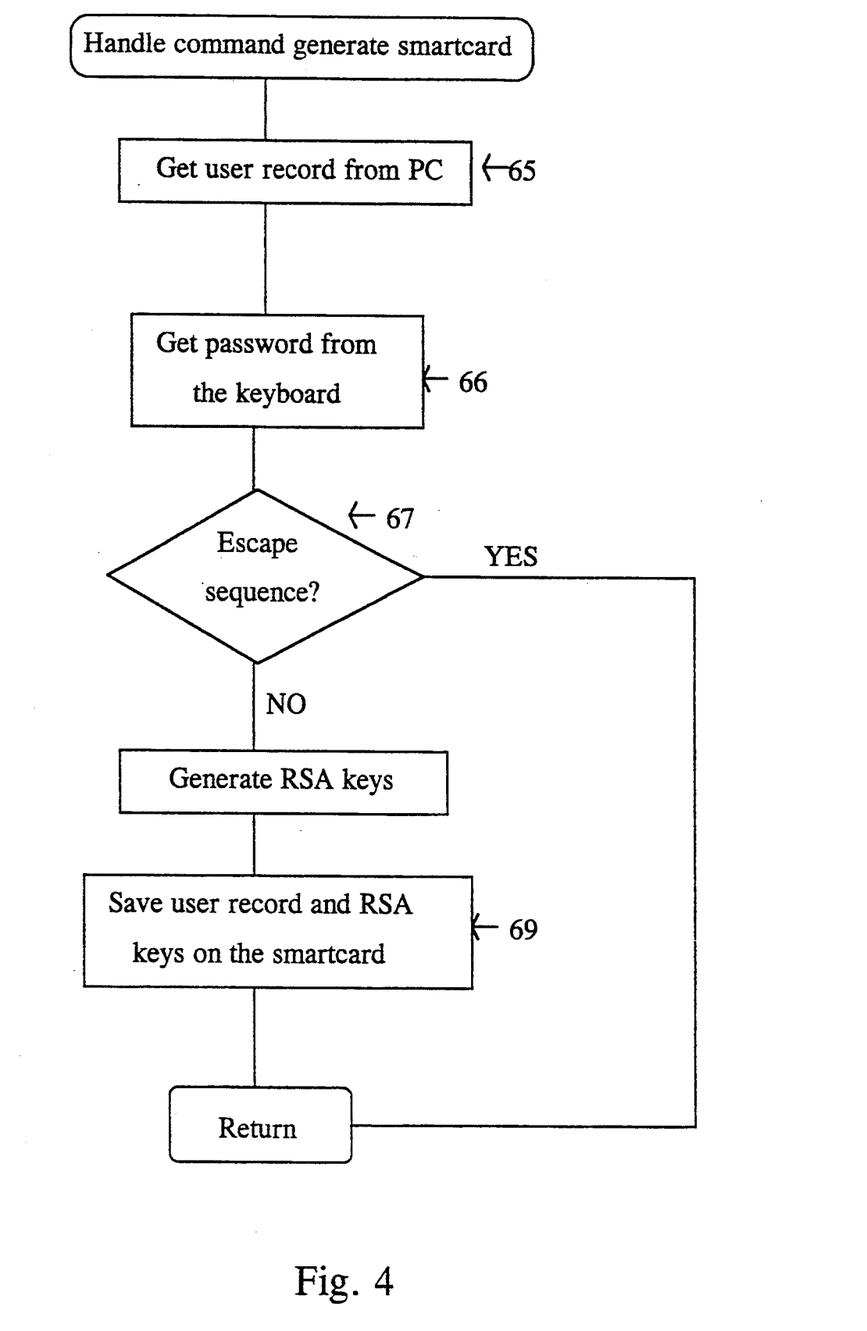

FIG. 4 illustrates the program for Generate Smartcard command. To generate the information for the smartcard 40 (FIG. 1), the security unit SU first obtains the information from the smartcard's user from the computer unit CU (block 65). The password is then introduced into the security unit via the keyboard unit KU (block 66). This assures that no virus programs can steal the password as the password never reaches the computer unit CU. Assuming no escape sequence is initiated by the operator (block 67), e.g., by the operator depressing an escape key because of an error, the security unit SU generates the RSA keys (block 68); and the information about the user and the RSA keys is written into the smartcard 40 (block 69).

RSA is a special algorithm used in ciphering and deciphering, and includes a public key involving public information available to anyone, and a private key which is used with the password to decipher the enciphered message. Further details of this ciphering and deciphering system are described, for example, in U.S. Pat. No. 4,405,829.

Figure 5:
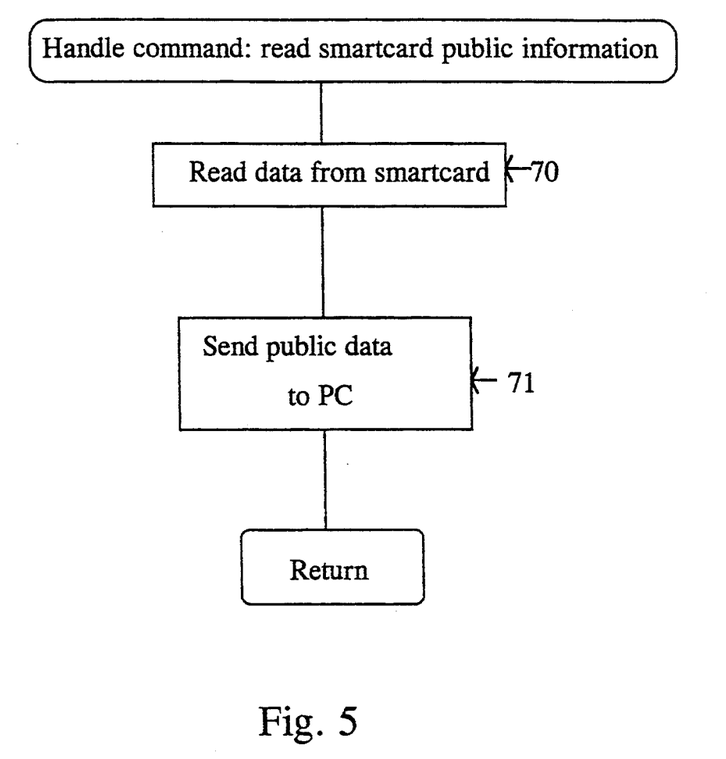

FIG. 5 illustrates the program when the command is Read Smartcard Public Information. Under this command, the smartcard is read (block 70), and the public data is sent to the computer unit CU (block 71). It is to be noted that the computer unit has no access to the private data (e.g., the RSA keys) which is on the smartcard.

Figure 6:
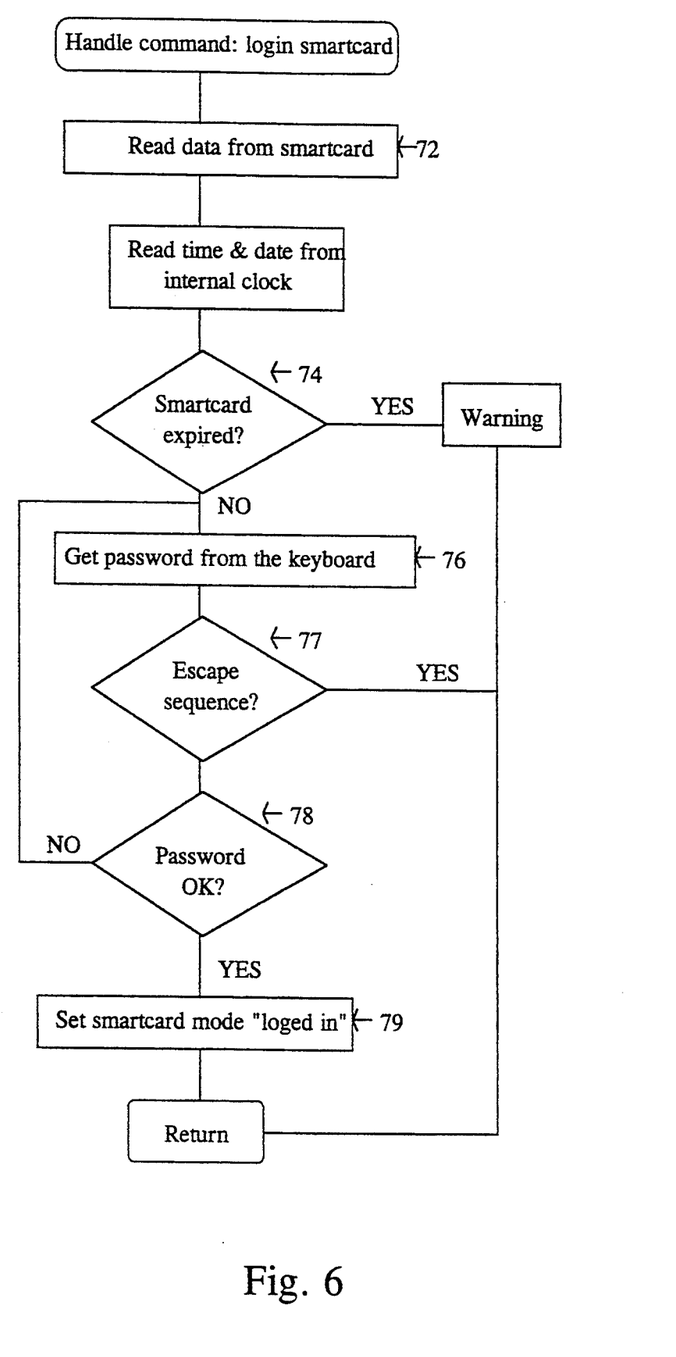

FIG. 6 illustrates the operations performed when the command is Login Smartcard. Here, the data is read from the smartcard (block 72); and the current time and date are read at the same time from the internal clock 30 (block 73). A decision is then made (block 74) whether the smartcard time has expired (e.g., valid only during certain times, or up to a certain deadline). If the smartcard has expired, a warning is produced (block 75), as described more particularly below with respect to FIG. 12. If the smartcard did not expire, the user then enters the user's password via the keyboard unit KU (bock 76). If no escape sequence has been selected (block 77), and the entered password is valid (block 78), the security unit SU sets its Smartcard mode to the "Logged in" Mode (block 79), wherein the information is read from the smartcard.

Figure 7:
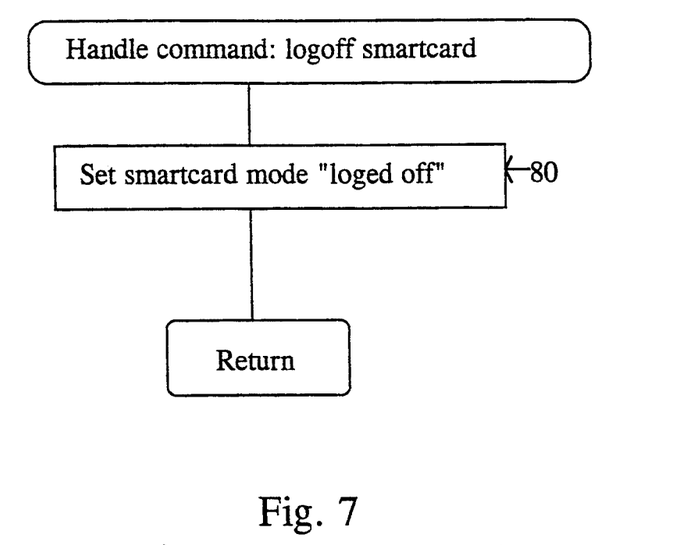

FIG. 7 illustrates the operations for the command Logoff Smartcard, wherein the security unit SU sets the Smartcard Mode to the "Logged off" Mode (block 80).

Figure 8:
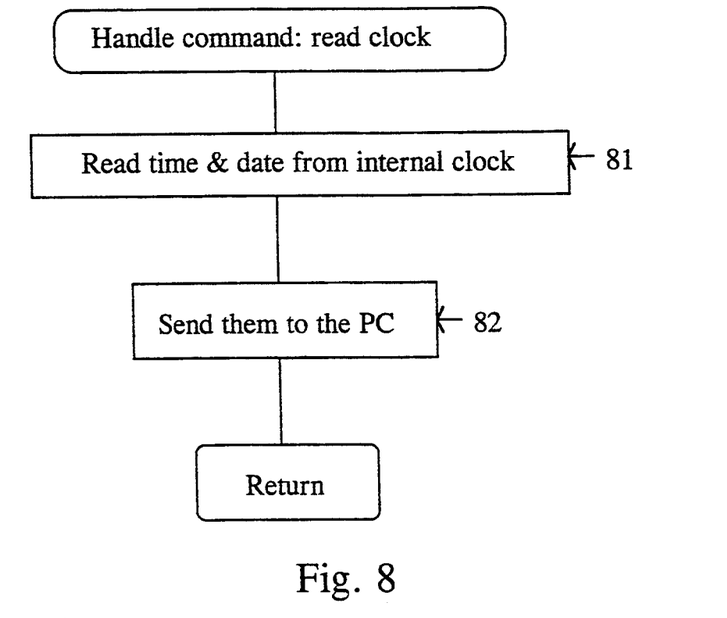

FIG. 8 illustrates the operations performed when receiving the Read Clock Command. When receiving this command, the security unit reads its internal clock 31 (block 81) and transmits the current time and date to the computer unit CU (block 82).

Figure 9:
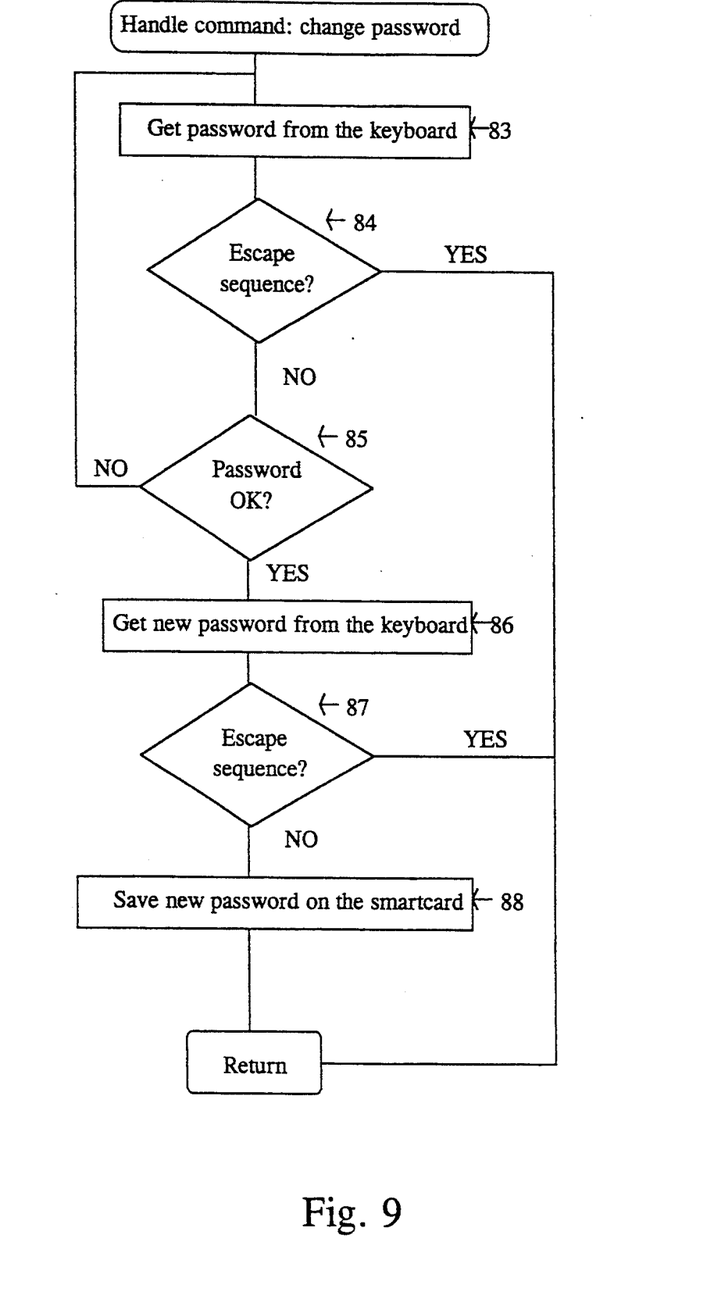

FIG. 9 illustrates the operations when receiving the Change Password Command. During this operation, the password must be entered via the keyboard unit KU (block 83) and assuming no escape sequence has been selected (block 84), and the entered password is valid (block 85), a new password may then be entered via the keyboard unit KU (block 86). Again, assuming no escape sequence is selected (block 87), the new password is stored on the smartcard (block 88).

Figure 10:
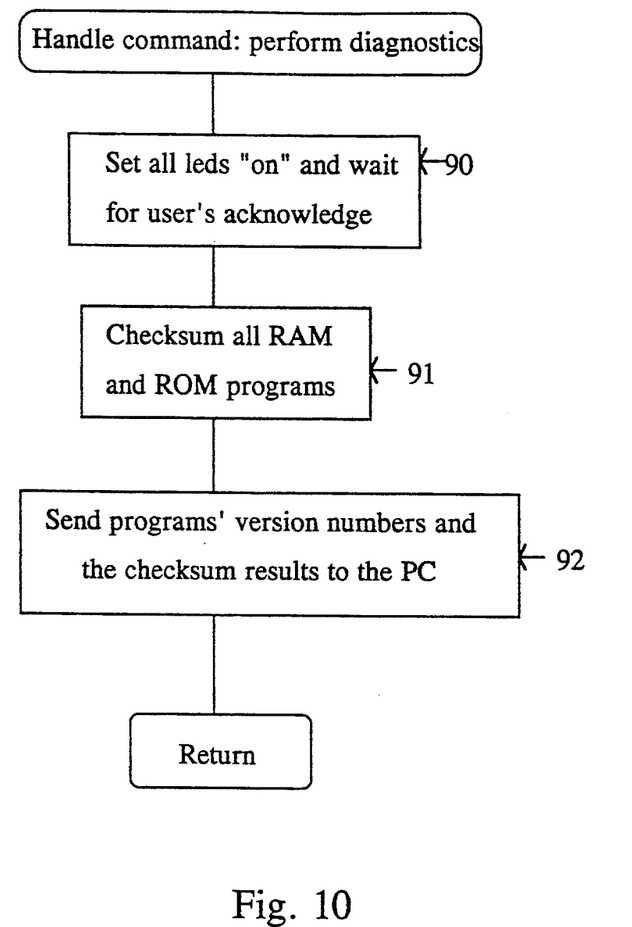

FIG. 10 illustrates the operations when receiving the command: Perform diagnostics. This command causes the security unit CU to energize all its indicator lamps and wait for the user's acknowledgment (block 90). Then, the existing programs are checked off by Checksum (block 91), and the results, as well as the programs'0 version numbers, are sent to the computer unit CU (block 92).

Figure 11:
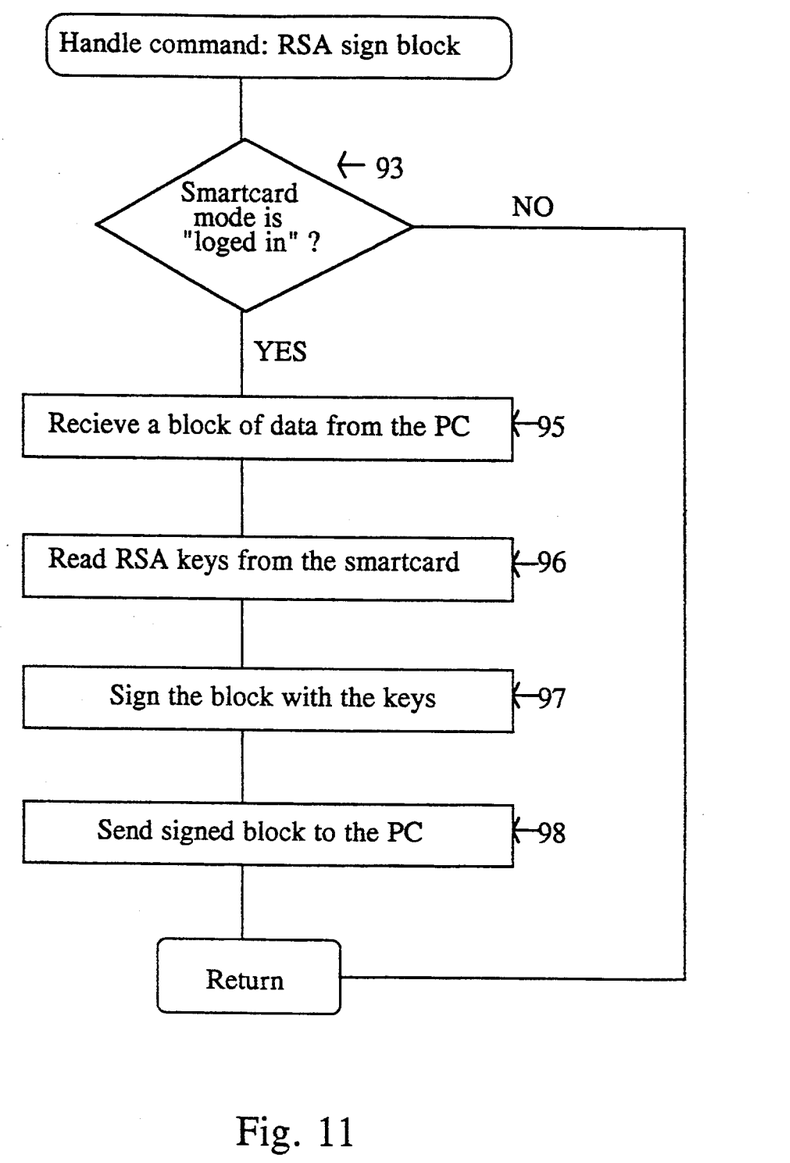

FIG. 11 illustrates the operations when receiving the command: RSA sign block. When receiving this command, the security unit SU checks to see whether the Smartcard Mode is locked in (block 93); if not, it actuates a warning (block 94), as described more particularly below with respect to FIG. 12; but if the Smartcard Mode is logged in, the security unit SU receives a block of data from the computer unit CU (block 95) reads the RSA keys from the smartcard (block 96), signs the block with the keys (block 97), and sends the signed block to the computer unit CU (block 98).

Figure 12:
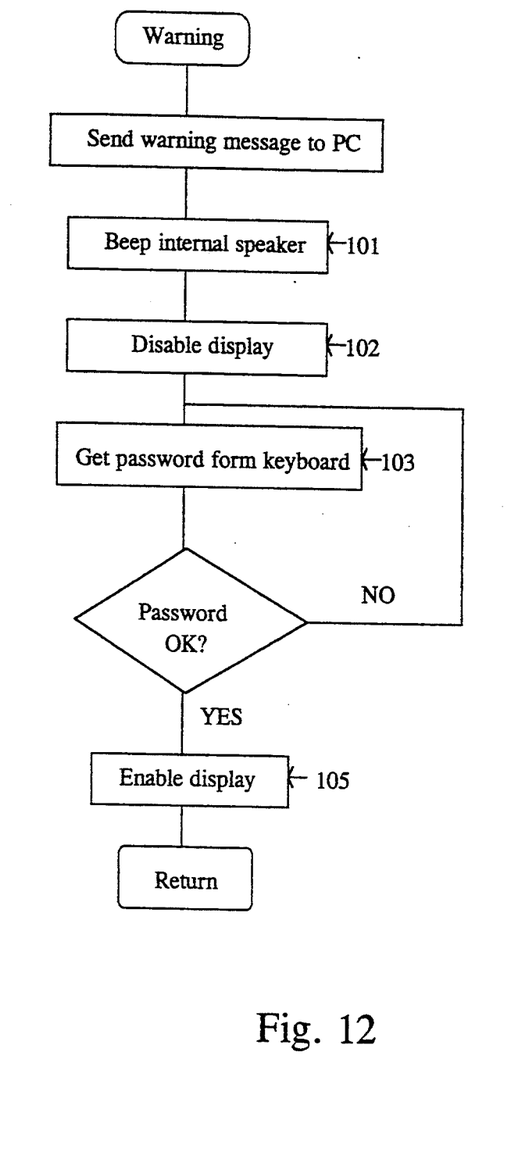

FIG. 12 illustrates the Warning Program, which is an internal program by which the other programs warn the computer unit CU. Thus, the security unit SU sends a warning message to the computer unit CU (block 100) through one of its lines (e.g., the computer unit's keyboard line), beeps its internal speaker 36 (block 101), disables the display (block 102), and waits for a password from the keyboard unit KU (block 103). Only when the correct password has been entered (block 104) is the display enabled again (block 105).

Figure 13:
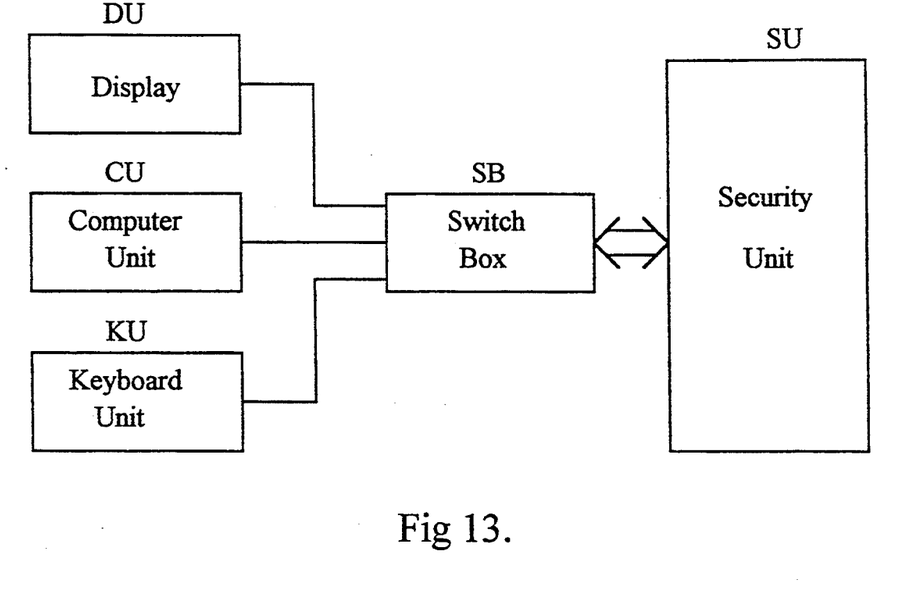
FIG. 13 is a block diagram illustrating another manner of connecting the security unit into a data processor system in accordance with the present invention.

It will be seen that the above-described system, the control for controlling the processor 22 of the security unit SU, to select either the Transparent Mode (FIG. 2), or one of the Special Handling Modes (FIGS. 3-12), is by pre-programmed software stored in the memory 26 of the security unit SU, which software automatically controls the security unit according to the command data inputted, i.e., via the keyboard unit KU or the smartcard 40. It is contemplated, however, that the control means could also be in the form of a switchbox connected to the computer unit, peripheral devices, and the security unit. Such an arrangement is illustrated in FIG. 13, wherein it will be seen that the switchbox SB is connected between the computer unit CU, its peripheral devices KU and DU, and the security unit SU, and enables manually selecting either the Transparent Mode, or a Special Handling Mode, such as described above with respect to FIGS. 3-12. Such an implementation of the invention is less preferable than the software implementation described above, but has the advantage over the previous known systems in that the security unit, with or without the smartcard reader, is not cluttered with many cables leading to and from it as in the previously known arrangements.

It will also be appreciated that the above description illustrates the invention as implemented in a data processor system including a general purpose computer, such as PC, the invention could be implemented in other types of data processor systems, such as one including a work station or the like.

Many other variations, modifications and applications of the invention will be apparent.

What is claimed is:

1. For use in a data processor system including a computer unit and a keyboard unit communicating with the computer unit via keyboard I/O ports in the keyboard unit and computer unit, respectively, a security unit for connection between said computer unit and said keyboard unit to isolate said computer unit from said keyboard; said security unit comprising:

a keyboard I/O port connectible to said keyboard I/O port in the keyboard unit for receiving data inputted from said keyboard unit;

a memory for storing said inputted data;

a keyboard I/O port connectible to said keyboard I/O port in the computer unit;

a processor storing a plurality of security programs for operating the security unit according to either a Transparent Mode wherein the stored data inputted from the keyboard unit via said keyboard I/O port is transmitted via said keyboard I/O port to said computer unit and is passed through said security unit without any change being made by the security unit in the stored data as if the security unit were not present, or according to a Special Handling Mode wherein a selected security program is executed while secret data inputted via the keyboard is isolated from the computer unit;

and control means for controlling said processor to select either the Transparent Mode or a Special Handling Mode.

2. The security unit according to claim 1, wherein said security unit further includes a smartcard reader for reading data from a smartcard inserted therein, which data is also stored in said memory; said control means also controlling said processor to process the data inputted via said smartcard reader according to the selected mode of operation.

3. The security unit according to claim 2, wherein said unit further includes a smartcard writer for writing data onto a smartcard inserted therein; said control means also controlling said processor to write data on the smartcard according to the selected mode of operation.

4. The security unit according to claim 1, wherein said security programs stored in said processor of the security unit include a plurality of Special Handling Modes of operation.

5. The security unit according to claim 4, wherein said stored Special Handling Modes includes a Load Program Mode; and wherein the security unit receives a program from the computer unit, receives a block of data purporting to be the signature of the program's fingerprint, computes the program's fingerprint, checks to determine whether the above block of data is indeed the signature of the program's fingerprint, and if so, loads the program into the security unit's processor.

6. The security unit according to claim 4, wherein said stored Special Handling Modes includes a Generate Smartcard Mode; and wherein the security unit receives information from the smartcard's user from the computer unit, receives a password from the keyboard, generates ciphering, deciphering keys, and writes information received from the computer unit and the ciphering, deciphering keys into the smartcard.

7. The security unit according to claim 4, wherein said stored Special Handling Modes include a Read Smartcard Mode; and wherein the inserted smartcard is read, and only the public data is sent to the computer unit.

8. The security unit according to claim 4, wherein said security unit further includes an internal real-time clock, and wherein said stored Special Handling Modes include a Login Smartcard Mode, in which data is read from an inserted smartcard, the current time and date are read from the internal clock, and a warning is produced if the time and date on the smartcard has expired.

9. The security unit according to claim 8, wherein said stored Special Handling Modes further include a Sign Block Mode; and wherein the security unit checks to determine whether the Smartcard Mode is logged in, issues a warning signal if the Smartcard Mode is not logged in; and if the Smartcard Mode is logged in, the security unit receives a block to sign, reads the signature keys from the smartcard, signs the block, and sends the results to the computer unit.

10. The security unit according to claim 4, wherein said stored Special Handling Modes include a Change Password Mode; and wherein the old password and the new password are both entered in the keyboard, and a new password is generated and is utilized with respect to said smartcard.

11. The security unit according to claim 4, wherein the security unit includes light indicators; and wherein said stored Special Handling Modes include a Perform Diagnostic Mode, wherein all said indicators are energized, the existing stored programs are checked, and the results are transmitted to the computer unit.

12. The security unit according to claim 1, wherein said security unit further includes two display I/O ports connectible to the computer unit and a display unit, respectively; said control means also controlling said processor to transmit data via said display port to the display unit.

13. The security unit according to claim 1, wherein said control means comprises preprogrammed software automatically controlling said processor according to the commands inputted from said keyboard unit or said computer unit.

14. The security unit according to claim 1, wherein said control means comprises manual switching means for manually selecting either the Transparent Mode or a Special Handling Mode.

15. A data processor system including the combination of a computer unit, a keyboard unit communicating with the computer unit via keyboard I/O ports in the keyboard unit and computer unit, respectively; and a security unit connecting said computer unit and said keyboard unit in a manner isolating said computer unit from said keyboard unit; said security unit comprising:

a keyboard I/O port connectible to said keyboard I/O port in the keyboard unit for receiving data inputted from said keyboard unit;

a memory for storing said inputted data;

a keyboard I/O port connected to said keyboard I/O port in the computer unit;

a processor storing a plurality of security programs for operating the security unit according to either a Transparent Mode wherein the stored data inputted from the keyboard unit via said keyboard I/O port is transmitted via said keyboard I/O port to said computer unit and is passed through said security unit without any change being made by the security unit in the stored data as if the security unit were not present, or according to a Special Handling Mode wherein a selected security program is executed while the secret data inputted via the keyboard is isolated from the computer unit;

and control means for controlling said processor to select either the Transparent Mode or a Special Handling Mode.

16. The system according to claim 15, wherein said unit further includes a smartcard reader for reading data from a smartcard inserted therein, which data is also stored in said memory; said control means also controlling said processor to process the data inputted via said smartcard reader according to the selected mode of operation.

17. The system according to claim 15, wherein said unit further includes a smartcard writer for writing data onto a smartcard inserted therein; said control means also controlling said processor to write data on the smartcard according to the selected mode of operation.

18. The system according to claim 15, wherein said stored Special Handling Modes includes a Load Program Mode, wherein the security unit receives a program from the computer unit, receives a block of data purporting to be the signature of the program's fingerprint, computes the program's fingerprint, checks to determine whether said block of data is indeed the signature of the program's fingerprint, and if so, loads the program into the security unit's processor.

* * * * *